United States Patent [19]

Shrum et al.

[11] Patent Number: 4,529,021
[45] Date of Patent: Jul. 16, 1985

[54] BLOCK STABILIZER FOR VENEER LATHE AND METHOD FOR OPERATING SAME

[75] Inventors: Kenneth L. Shrum, Glide; Lawrence G. King; Anton S. Richert, both of Roseburg, all of Oreg.

[73] Assignee: Sun Studs, Inc., Roseburg, Oreg.

[21] Appl. No.: 594,569

[22] Filed: Mar. 29, 1984

[51] Int. Cl.³ .............................................. B27L 5/02
[52] U.S. Cl. .................................... 144/357; 144/365
[58] Field of Search ............... 144/209 R, 209 A, 213, 144/356, 357, 365

[56] References Cited

U.S. PATENT DOCUMENTS

| | | | |
|---|---|---|---|
| 2,884,966 | 5/1959 | Zilm | 144/213 |
| 3,421,560 | 1/1969 | Springate | 144/209 A |
| 3,584,666 | 6/1971 | Jensen | 144/213 |
| 3,898,555 | 8/1975 | Tellerman | 324/34 D |
| 4,073,326 | 2/1978 | Pank et al. | 144/213 |
| 4,378,829 | 4/1983 | Sohn | 144/357 |
| 4,381,023 | 4/1983 | Fronczak et al. | 144/209 R |
| 4,392,519 | 7/1983 | Calvert | 144/209 R |
| 4,454,900 | 6/1984 | Hayes | 144/213 |

Primary Examiner—W. D. Bray
Attorney, Agent, or Firm—Chernoff, Vilhauer, McClung, Birdwell & Stenzel

[57] ABSTRACT

Apparatus for stabilizing a rotating block of wood from which veneer is being peeled in a veneer lathe, and a method for its operation. A block stabilizer includes a massive stabilizer head having paired rollers which extend along a majority of the length of the block of wood, parallel with the axis of rotation of the block being peeled. Sensors produce electrical signals used to inform a computer of the location of the veneer knife. The computer provides position orders to move the block stabilizer head to hold the surfaces of the rollers at the expected location of the peripheral surface of the block in response to movement of the veneer knife during the entire process of peeling veneer from the block. A sensor is provided to measure the surface speed of the periphery of the block being peeled and computer control is provided to temporarily change the relationship between the location of the veneer knife and the location of the rollers, in response to sensing that the block is larger than expected in view of the location of the veneer knife.

15 Claims, 15 Drawing Figures

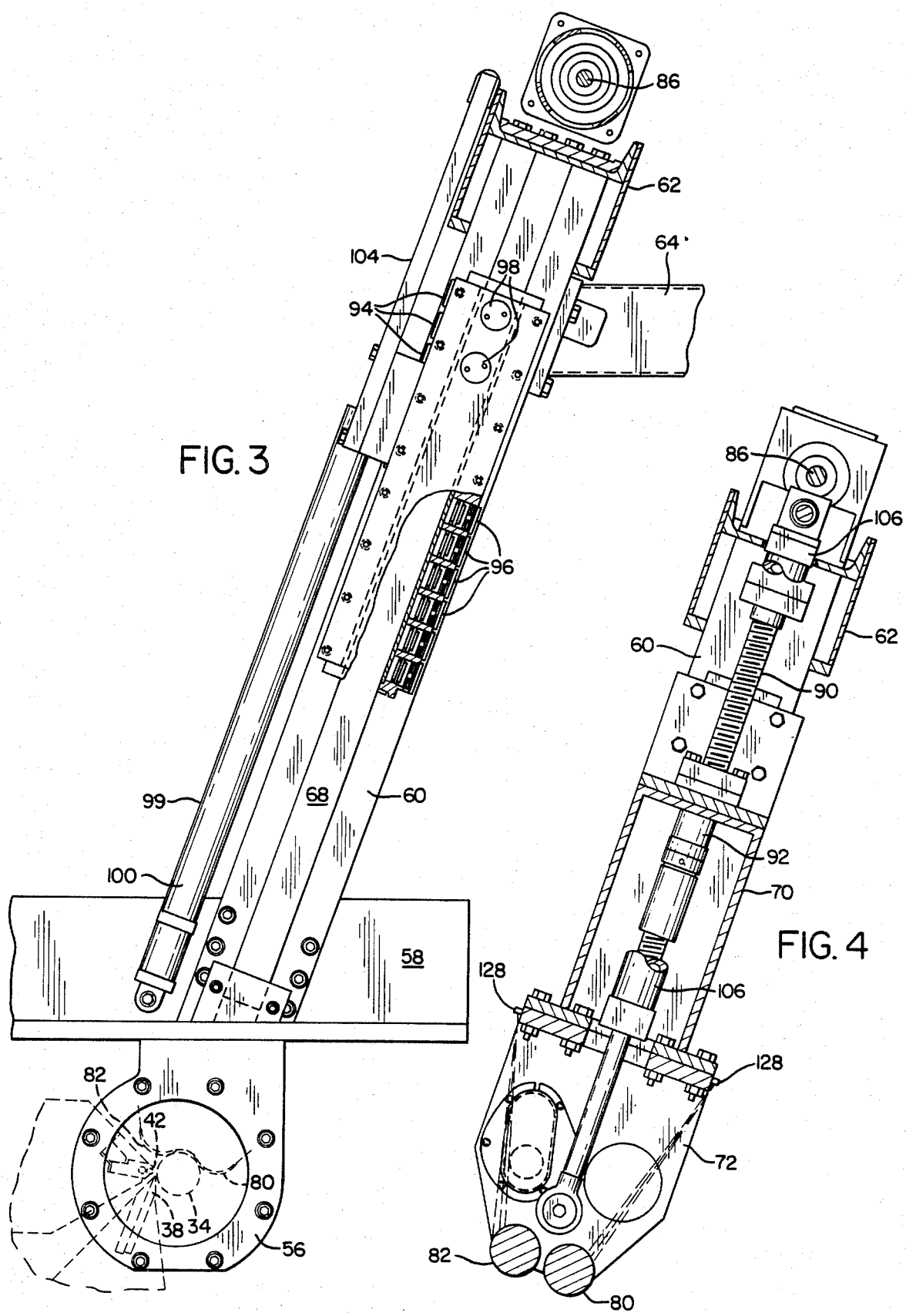

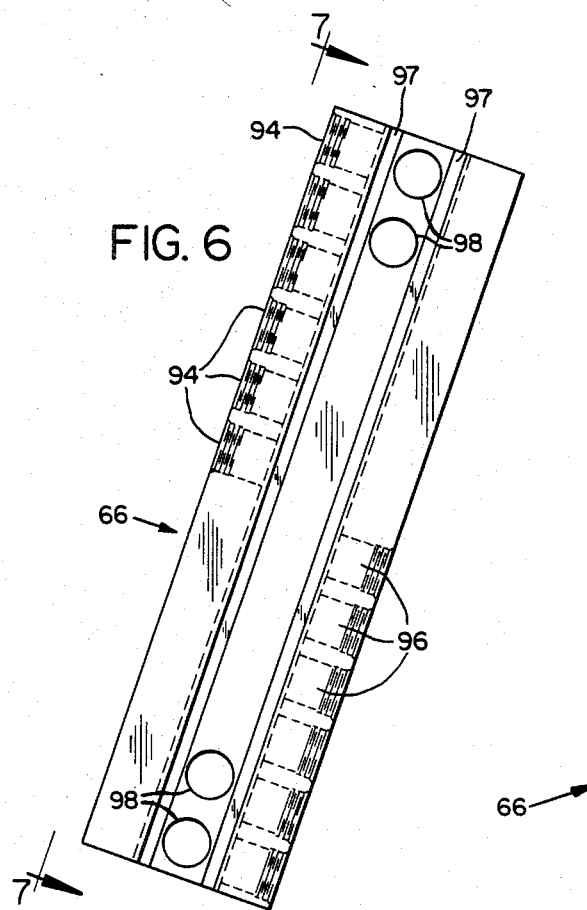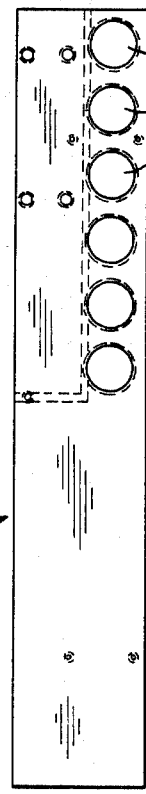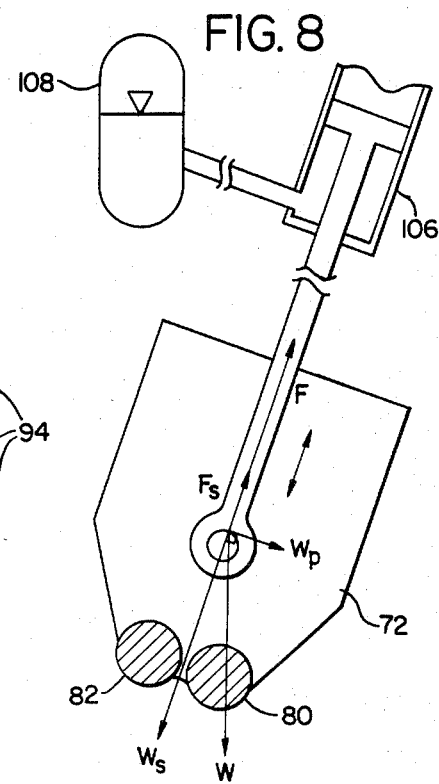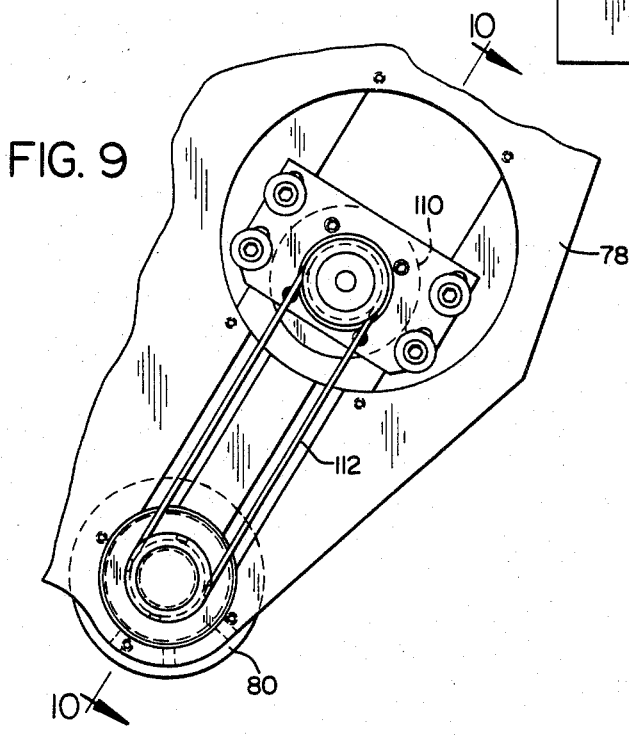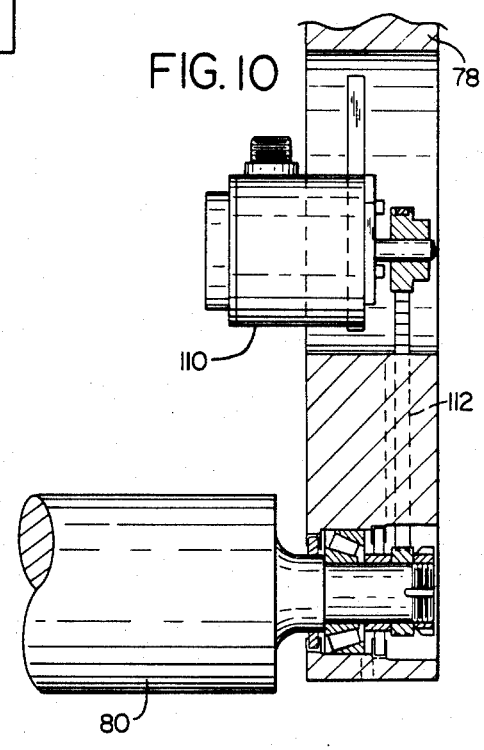

BLOCK STABILIZER FOR VENEER LATHE AND METHOD FOR OPERATING SAME

BACKGROUND OF THE INVENTION

The present invention relates to veneer lathes, and particularly to a stabilizer and a method for its use for helping to hold a log of wood properly aligned with the spindles of a veneer lathe during cutting of veneer from the log.

Veneer for use in manufacture of plywood is commonly produced on a veneer lathe by cutting ("peeling") a thin spiral layer from a log. As transportation and energy costs increase and the cost of timber suitable for use in veneer also increases, the economic justification of maximizing the yield and quality of veneer from every log becomes more apparent.

In the usual lathe used for production of veneer for plywood, a log, normally called a "block," is held horizontal and rotated about a central longitudinal axis, while a veneer knife having an upwardly exposed edge extending parallel with the block's axis of rotation is moved toward the center of the block at a regular rate. Normally, a pressure bar, such as a roller nose bar, extends parallel with the edge of the veneer knife and is located a predetermined distance above and radially outward from the edge. The pressure bar provides pressure against the block which helps to govern the thickness of the veneer peeled, and which determines to some extent whether the veneer splits or is solid.

Economical production of high quality veneer requires close control over the position of a block being peeled, as well as accurate control of the movement and position of the veneer knife of the lathe during peeling. Since the nominal thickness of much veneer cut for manufacture of plywood is 1/10 inch, a variation in veneer thickness of only 0.001 inch is a change in yield of 1%.

It has been customary in the past to control the position of a block being peeled by the chucks and pressure bar of the lathe, until the block being peeled has become so small that flexure becomes a possible problem. Flexure of a block being peeled often results in veneer which is not flat and is therefore unsatisfactory for manufacture of plywood. The veneer may cup toward its center and split at the lateral edges if the block bows away from the knife and veneer is cut thinner in the middle than at the ends of the block.

Core bracers have been used in the past to try to keep veneer flat by preventing such flexure of the middle portion of a block being peeled. Such core bracers previously used include short rollers which contact only a middle portion of the length of the block. If such a prior art core bracer bends the block toward the veneer knife, however, it may result in the block becoming too slender in the center, creating veneer having wavy edges.

Additionally, flexure of the spindles of veneer lathes allows some variation of veneer thickness as the entire block moves relative to the veneer knife. In order to assure veneer of at least the minimum thickness, it has previously been necessary to cut veneer slightly thicker than actually desired. This, too, reduces the yield from each block.

Prior art core bracers have typically attempted to keep the center portion of a block aligned with the ends of the block where the chucks support it by using a tracer to follow the surface of the block near an end. A problem frequently encountered in use of such core bracers is that surface irregularities apparent at the end of a block are proliferated and perpetuated, rather than being eliminated, and the quality of veneer produced is not as good as is desired.

Some types of core bracers utilized in the past interfere with the use of automatic veneer lathe chargers which automatically place blocks into the chucks of a veneer lathe in the position which is calculated to produce the greatest amount of veneer from each block. Other previously known core bracers and similar devices can not be precisely positioned in correlation with the intended location of the block being peeled. For instance, many core bracers include parallel rollers on a pivoted head which provides some support, yet still permits a significant amount of movement of the veneer block. Yet other core bracers, when in use, obstruct the lathe operator's view of the peeling operation.

Veneer blocks often contain imperfections, such as radial cracks (checks) and annular cracks (pitch rings). Either of these may result in a block splitting apart before it has been peeled to the desired minimum diameter. A lathe operator, observing the presence of a pitch ring or a large radial check, usually prefers to drop such block from the chucks of the lathe, before it can split apart, possibly plugging or damaging the lathe. It would be desirable, however, to produce a maximum amount of veneer from such portions of a veneer block which might otherwise be ejected from the lathe by the lathe operator.

As a block is peeled from an original large diameter to a smaller diameter the upward force exerted by the knife during cutting of veneer at a particular surface speed remains approximately constant as the weight of the block being peeled decreases. As a result, the block tends to rise slightly with respect to the edge of the knife, changing the effective angle between the knife and the surface of the block. The tendency of the block to rise changes the angle of incidence of the knife relative to the surface of the block and thus tends to change the thickness of the veneer produced.

What is needed, therefore, is apparatus and a method for its use to provide improved control of the thickness of veneer produced and to enhance production of a greater amount of veneer from a given block through stabilization of the location of the block throughout the process of peeling. Such a device and method should be usable in conjunction with a veneer lathe equipped with an automatic log charger, without interfering with use of the charger.

SUMMARY OF THE INVENTION

The present invention overcomes some of the shortcomings felt in the past with respect to veneer lathe operation, by providing a block stabilizer and a method for its use in conjunction with a veneer lathe to control more accurately the thickness of veneer produced. In the apparatus of the present invention paired parallel rollers are carried on a block stabilizer head which is movable radially with respect to the axis of rotation of the spindles of a veneer lathe. The rollers are supported rotatably at fixed locations on the stabilizer head and extend along nearly the entire length of a block of wood held between the chucks of the lathe. The block stabilizer head is moved radially inwardly toward the axis of rotation of the spindles of the lathe in servo-controlled coordination with the position of the veneer knife, so as to contact the surface of a block from which veneer is being cut and hold the block in a position as close as possible to being concentric with the spindles of the lathe.

In the usual veneer lathe a carriage on which the veneer knife is mounted moves horizontally, carrying the edge of the knife toward the axis of rotation of the spindles. The block stabilizer of the present invention is constructed for use with such a lathe so that the stabilizer head moves downward toward the spindle axis of rotation along an inclined radial path separated angularly from the path of the veneer knife by approximately one-third of a revolution. Thus the rollers of the stabilizer head contact the surface of the block on either side of a radial plane which is located approximately 110° from the plane defined by movement of the edge of the veneer knife, and the lathe operator's visibility of the lathe is not impaired.

The position of the stabilizer head is controlled in response to movement of the veneer knife throughout the process of cutting veneer from each block. The combination of the rotation forces of the veneer lathe chucks, the weight of the block, the upward force of the veneer knife edge, the inward force of the pressure bar which accompanies the veneer knife, and the downward and forward force of the block stabilizer of the present invention thus hold a block in the proper location throughout substantially the entire process of cutting a layer of veneer from the block.

The present invention is directed to accuracy in maintaining the position of the block being peeled. For that reason the block stabilizer is massively constructed. It includes a frame which rests upon the lathe spindle bearing pedestals and is securely braced to resist deflection and vibration. This is done in order to avoid unevenness in the veneer which might otherwise result from misdirection of the large amounts of kinetic energy involved when rotating a block weighing several hundreds of pounds, particularly when knots and other irregularities in the wood are encountered by the veneer knife.

The block stabilizer head itself is massive, but its weight is counterbalanced by fluid at a substantially constant pressure in a pair of cylinder and piston assemblies which pull upwardly against the stabilizer head. Nevertheless, the inertia of the mass of the stabilizer head is available to resist vibration of the block during peeling of veneer. This inertia contributes to the even progress of the stabilizer head during peeling of a block.

A small reduction in the thickness of the veneer cut from the block with each rotation can soon result in a block being significantly larger than to be expected in view of the distance between the edge of the knife and the lathe spindle axis of rotation. The cumulative effect of several wraps of veneer cut even one or two thousandths of an inch too thin might ultimately force the block out of the chucks of the lathe. By measuring the surface speed of the veneer block and comparing the observed surface speed with the theoretical surface speed calculated from the position of the veneer knife and the speed of rotation of the veneer lathe chucks, the apparatus of the present invention determines whether the block is larger than it should be and thus whether it is being peeled at the rate of advance of the knife. The apparatus thus determines whether the block is in its proper location or is being squeezed rearwardly and downwardly by the pressure bar and the block stabilizer, which would change the angle of incidence of the veneer knife against the surface of the block.

The position of the block stabilizer relative to the lathe spindle is corrected, in accordance with the present invention, if the block remains larger than it should be, as determined by the observed surface speed of the block indicating that the actual radius of the block is greater than it should be for the particular position of the veneer knife. Correction of the position of the stabilizer head is accomplished by temporarily slowing its downward radially inward progress during peeling of the block. This permits the block to rise with respect to the chucks of the lathe to a position which maintains the desired angle of incidence of the veneer knife with respect to the surface of the block, and restores the desired thickness of the veneer cut. The block stabilizer is then returned to its theoretically proper speed of radially inward movement relative to the chucks of the lathe and the veneer knife. This method of controlling the block stabilizer gives better control of veneer thickness than is possible in a lathe not equipped with a block stabilizer.

Preferably, a control system incorporating computers is used to interrelate operation of the veneer lathe, a veneer lathe log charger which positions blocks in the chucks of the lathe, and the block stabilizer of the present invention, so that the block stabilizer automatically stays out of the way of the charger during its operation. The block stabilizer is held back further than the veneer knife edge from the chuck axis of rotation until a newly chucked block is rotated at least about two-thirds of a rotation and preferably a complete rotation, so that the veneer knife has an opportunity to remove any projections from the block before the stabilizer can interfere. Thereafter, the block stabilizer, in response to the position of the veneer knife, is brought into position to stabilize the block throughout the process of actually peeling the veneer from the block. When the block has been peeled to the minimum diameter desired, as the chucks are withdrawn the block stabilizer is automatically retracted upwardly to provide room for chucking the next block to be peeled. Preferably, the block stabilizer is withdrawn to a position removed from the lathe spindle axis of rotation by a predetermined distance further than the distance to which the veneer knife is retracted.

During operation of the block stabilizer automatic measuring devices provide electronic signals indicating the position of the veneer knife, the position of the log charger, the size of a block being placed into the chucks, the amount of rotation of the chucks, and the surface speed of the block to the computers of the control system. The computers use this information to determine where the block stabilizer should be and then transmit signals to the controllers of the servo motors which move the block stabilizer.

It is therefore a principal object of the present invention to provide apparatus for stabilizing a block of wood in an optimum position in a veneer lathe during peeling of veneer, so as to improve the yield and quality of the veneer produced.

It is another object of the present invention to provide an improved method for operating a veneer lathe in order to improve the quality and yield of veneer.

It is a principal feature of the present invention that it provides block stabilizing apparatus including parallel rollers extending over nearly the entire length of a veneer block.

It is another important feature of the present invention that it provides a block stabilizer having a massive head which moves radially inwardly in response to the movement of the veneer knife of the veneer lathe during production of veneer, providing a large amount of inertia to resist irregular movement of a block being peeled.

It is a further important feature of the present invention that it provides apparatus and a method for frequently determining the size of a block being peeled and correcting the position of a block stabilizer, in response to determining the actual size of a block being peeled, to prevent the block from being pushed from the chucks of the lathe as a result of uneven peeling of veneer.

It is yet a further feature of the present invention that it provides a block stabilizer which assumes a predetermined waiting position in response to the size of a block being inserted into a veneer lathe.

A principal advantage of the present invention is that it significantly increases the average amount of high quality veneer peeled from each block.

It is another key advantage of the present invention that it results in recovery of increased quantities of usable veneer from blocks including annular pitch rings or radial checks.

It is another important advantage of the present invention that it enables the peeling of a greater percentage of veneer blocks to a desired core diameter than was previously possible.

It is yet a further advantage of the present invention that it provides an improved quality of veneer produced.

BRIEF DESCRIPTION OF THE DRAWINGS

FIG. 3 is a partially cut-away sectional view of the block stabilizer of the present invention and parts of the veneer lathe of FIG. 1, taken along line 3—3 of FIG. 2.

FIG. 4 is a sectional view, taken along line 4—4, of the stabilizer head and a portion of the frame of the block stabilizer shown in FIG. 2, showing the stabilizer head fully raised.

FIG. 6 is an end elevational view, at an enlarged scale, of a portion of the stabilizer head shown in FIG. 2, showing the fluid pressure-biased bearings which locate the stabilizer head with respect to the stabilizer head guide rails.

FIG. 7 is an oblique view, taken along the line 7—7, of the fluid pressure-biased bearings shown in FIG. 6.

FIG. 8 is a simplified partially schematic end elevational view of the stabilizer head of the block stabilizer shown in FIG. 1.

FIG. 9 is a right end elevational view of a portion of the stabilizer head shown in FIG. 1.

FIG. 10 is a sectional view, taken along line 10—10, of the portion of the block stabilizer head shown in FIG. 9.

DETAILED DESCRIPTION OF THE INVENTION

Figures 1, 5:
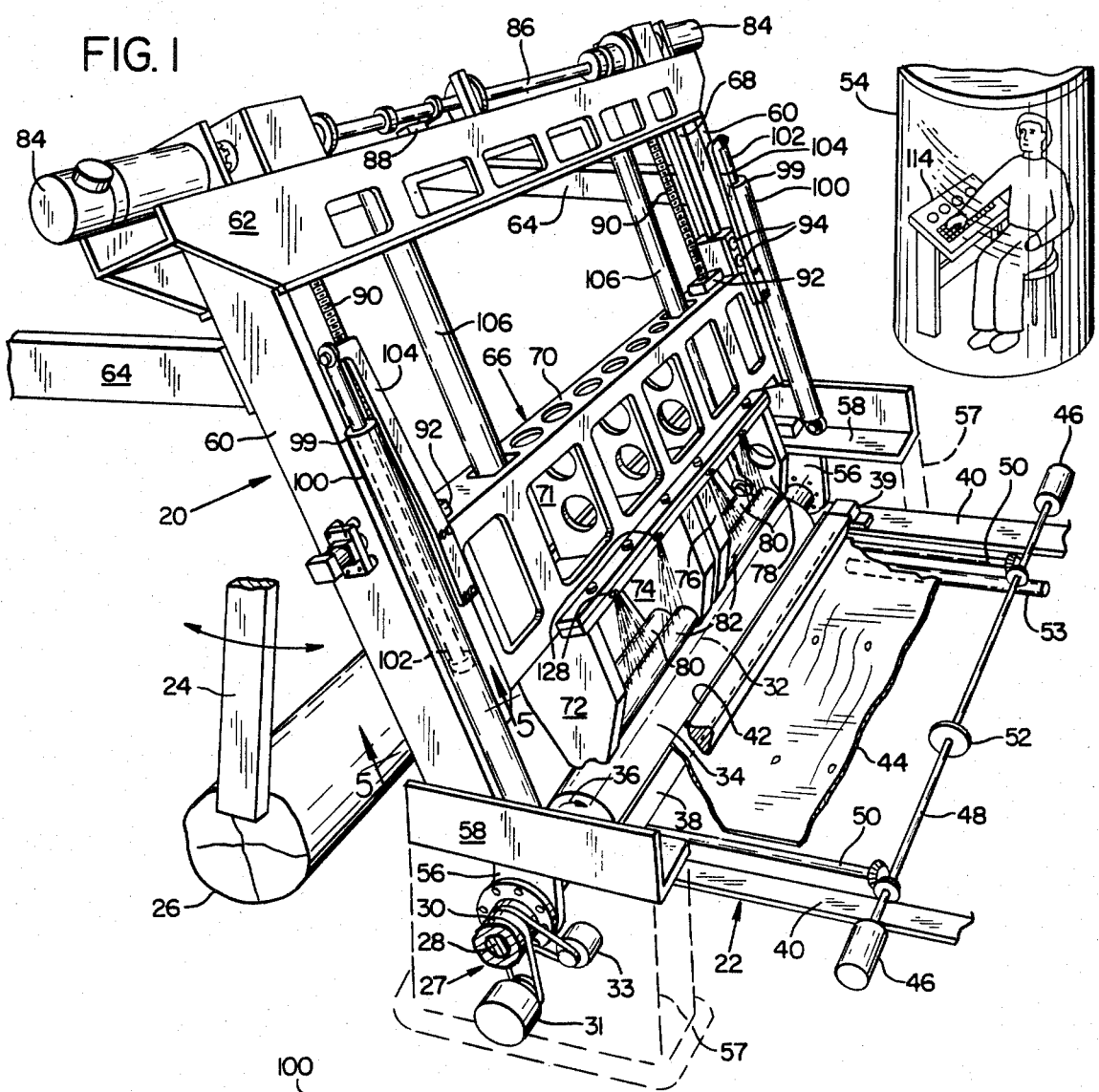
FIG. 1 is a perspective view of a veneer lathe equipped with a block stabilizer embodying the present invention, taken from the left front of the block stabilizer.
FIG. 5 is a sectional view, taken along line 5—5, of portions of the main frame and stabilizer head of the block stabilizer shown in FIG. 1.
Figure 2:
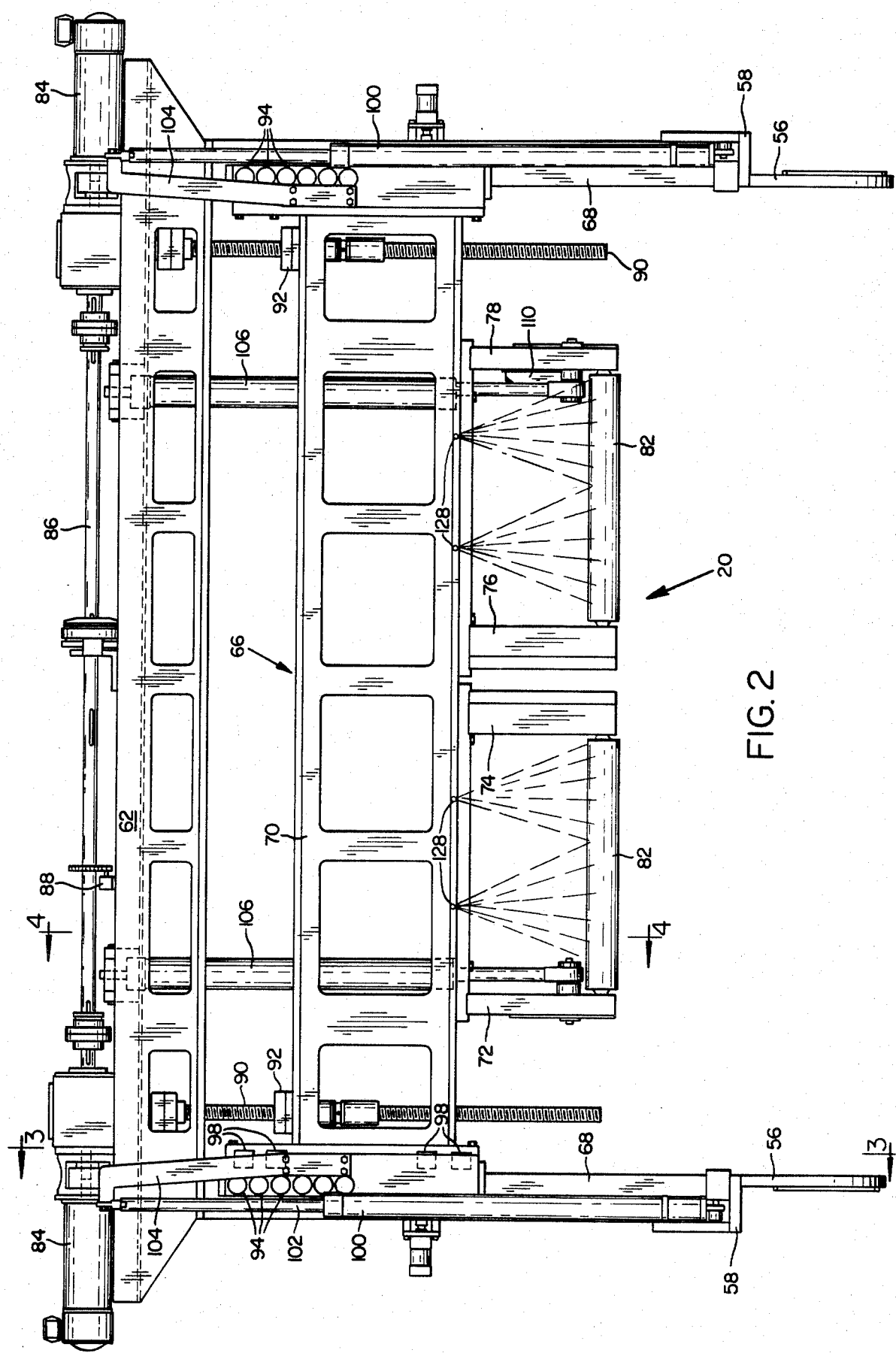
FIG. 2 is an upper front oblique view of the block stabilizer of the present invention.

Referring now to the drawings, a block stabilizer 20 is shown in FIG. 1, along with a greatly simplified veneer lathe 22 and a veneer lathe log charger, of which only one charger arm 24 is shown. A log 26, held by the charger arm 24, is in a position of readiness to be placed in the veneer lathe 22 to be peeled into veneer.

A typical veneer lathe 22 with which the block stabilizer 20 of the present invention might be used comprises a pair of spindles 27 each having an inner chuck 28 and an outer chuck 30, the spindles being driven by a spindle drive motor 31. The normal position of the spindles 27 defines a chuck axis or spindle axis of rotation 32 which is assumed to be stable with respect to the rest of the lathe 22. An optical disc encoder 33 is driven by rotation of one of the spindles 27 to produce a series of electrical voltage pulses which accurately reflect the amount rotation of the spindles 27. Such a disc encoder may, for example, produce 9600 pulses per rotation of the spindles 27.

A veneer block 34 held between the chucks 28 and 30 is rotated about the spindle axis of rotation 32, which preferably coincides with a central longitudinal axis 35 of the block 34, by a spindle drive motor 31 which rotates the chucks clockwise as indicated by the arrow 36 in FIG. 1.

Figure 11:
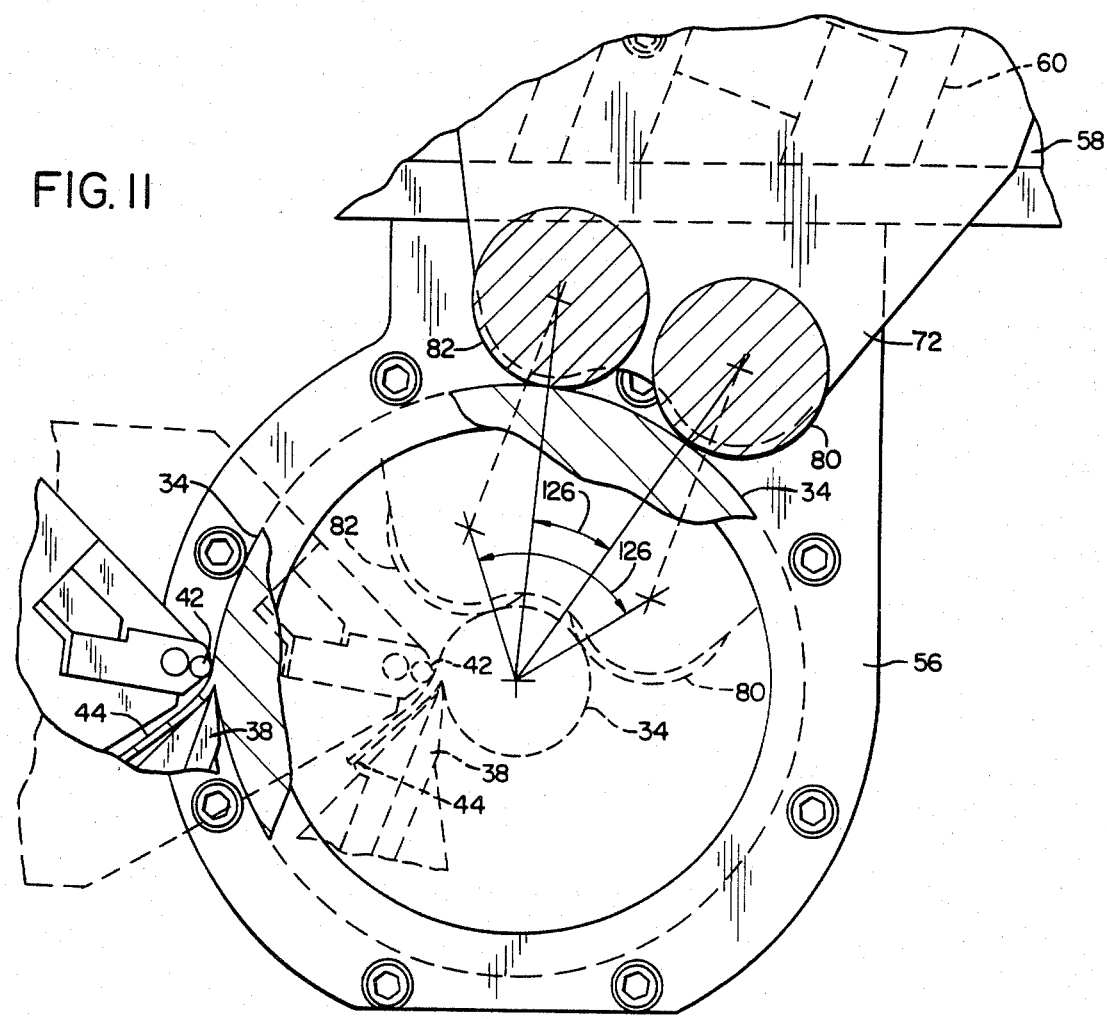
FIG. 11 is an elevational view of a lower portion of the frame of the block stabilizer shown in FIG. 1 looking outward, showing certain relationships of the block stabilizer to a block being peeled in the lathe.

A veneer knife 38, shown greatly simplified in FIG. 1, is mounted in a carriage 39 movable in a direction perpendicular to the spindle axis of rotation 32 along a pair of parallel ways 40 which extend horizontally on the side of the lathe 22 on which the surface of the block 34 is moving downwardly. The edge of the veneer knife 38 is exposed upwardly, and a pressure bar 42 is normally associated with the veneer knife 38, extending parallel with its edge. Usually, as may be seen more clearly in FIGS. 3, 11, and 13, the pressure bar 42 is located slightly higher than the edge of the knife 38 and is spaced radially outward from the spindle axis of rotation 32 a small distance farther than the edge of the knife 38. A layer of veneer 44, shown in broken line in FIG. 1, passes downwardly between the nose bar 42 and the knife 38 as it is peeled from the block 34.

As the chucks 28 and 30 are rotated, rotating the block 34, the veneer knife 38 is advanced radially inward toward the chuck axis of rotation at a controlled rate. Usually this is accomplished mechanically by a mechanism such as a pair of knife carriage feed motors 46 driving a knife carriage feed drive cross shaft 48, which, in turn, drives a pair of ball screws 50 which advance the carriage 39 along the ways 40.

An optical disc encoder 52, similar to the encoder 33, is located on the knife carriage feed drive cross shaft 48 and provides a series of electrical pulses indicating rotation of the knife carriage feed drive cross shaft 48. Such pulses are utilized by a control system for the block stabilizer as will be described in greater detail hereinbelow.

Preferably, the actual position of the knife carriage 39 is sensed by a suitable device such as a position sensor 53. Such a position sensor 53 may preferably be of the type described in Tellerman U.S. Pat. No. 3,898,555 and Sohn U.S. Pat. No. 4,378,829, of which the disclosures are hereby incorporated herein by reference. The position sensor 53 generates an electrical signal of pulses which reports the position of the veneer knife 38 in a form usable by a lathe control system computer as will be explained more fully herebelow.

The log charger of which the charger arm 24 is only a part includes measurement apparatus (not shown) which is capable of providing an electrical signal to a computerized control system associated with the veneer lathe 22 and block stabilizer 20 to indicate the shape and size of the log 26. The computerized control system associated with the log charger relates operation of the log charger to operation of the chucks 28 and 30 of the lathe, as is explained in Sohn U.S. Pat. No. 4,378,829, mentioned previously.

An operator cab 54 is located above and to one side of the ways 40, giving an operator controlling the veneer lathe 22, the block stabilizer 20, and the log charger a clear view of the spindles 27, chucks 28 and 30, the block 34, and the knife carriage 39 during operation of the veneer lathe 22.

The block stabilizer 20 includes a frame supported by the pedestals 57 supporting the spindles 27 of the veneer lathe 22. The frame includes a pair of piloted mounting flanges 56 which fit around the chucks 28 and 30 and are bolted to the spindle drive pedestals 57 at the respective ends of the veneer lathe 22, rigidly fastening the block stabilizer 20 to the veneer lathe 22. A pair of horizontal support members 58 rest atop the pedestals 57 of the veneer lathe spindle drives, so that the veneer lathe 22 supports the block stabilizer 20. This adds the inertia of the block stabilizer 20 to that of the lathe 22 to resist vibration during its operation.

A pair of main side members 60 of the frame extend slopingly upward above the horizontal supports 58, being oriented at an angle of approximately 20° out of vertical, and thus separated by an angle of 110°, about the spindle axis of rotation 32, from the horizontal plane in which the edge of the knife 38 moves. A main cross member 62 extends horizontally between the upper ends of the main side members 60, and horizontal brace members 64 extend rearwardly from each of the main side members 60 and are fixedly connected with portions (not shown) of the veneer lathe charger. The brace members 64 thus fixedly connect the block stabilizer 20 with the structure of the lathe charger and establish fixed spatial relationships among the block stabilizer 20, the lathe charger, and the veneer lathe 22.

Referring now also to FIGS. 2-5, a stabilizer head 66 extends horizontally between the main side members 60 and is movable along guide rails 68, one of which is located on each of the main side members 60. The stabilizer head 66 includes a massive horizontal beam 70 of box construction, which includes stiffeners 71 to make the beam 70 rigid against both torsion and bending in the plane in which it moves along the guide rails 68. Fixedly attached to the lower side of the main beam 70 are four roller supports 72, 74, 76, and 78. A pair of rear rollers 80 and a pair of front rollers 82 are supported rotatably between the roller supports 72, 74, 76, and 78. Each of the rollers 80 and 82 is cylindrical and is aligned with its respective outer surfaces and axis of rotation parallel with the spindle axis of rotation 32. The outer surfaces of the rollers 80 and 82 are, in an exemplary embodiment of the invention, each about 35 inches long, so that they potentially contact nearly 70 percent of the length of a block 34, 102 inches long, with the supports 72, 74, 76 and 78 being located as close as practical to the middle and respective ends of the horizontal beam 70, allowing clearance for the log charger to place a block into the lathe 22. Because some longitudinal separation of the rollers 80 and 82 is required to provide room for the supports 74 and 76 in the middle of the head 66, the rollers 80 and 82 extend over about 86 inches, or about 85% of a block 102 inches long, providing significantly more support than is provided for blocks in previously known veneer lathes.

A pair of stabilizer head feed drive motors 84, which may, for example, be high-speed DC servo motors, are coupled at respective opposite ends of a block stabilizer feed main shaft 86, which extends along the main cross member 62. An optical disc encoder 88, similar to the encoder 52, is driven by the main shaft 86 through a drive belt and transmits a series of electrical impulse signals indicating rotation of the stabilizer main shaft 86 to the control system of the block stabilizer 20. A pair of ball screws 90 are driven by the main shaft 86, through respective gearing located near each end of the main cross member 62 of the frame of the block stabilizer 20. Each ball screw 90 extends downward, parallel with the respective guide track 68, through a respective ball screw nut 92 fixedly located on the main beam 70, to move the stabilizer head 66 along the guide tracks 68 in response to rotation of the block stabilizer feed main shaft 86.

The stabilizer head 66 moves along the guide tracks 68 closely controlled by a set of fluid pressure-biased bearings, which very closely limit the amount of lateral or transverse movement of the main beam 70 with respect to the guide rails 68. Similar to fluid pressure-biased bearings disclosed in greater detail in the previously mentioned U.S. Pat. No. 4,378,829, such bearings comprise respective hydraulic cylinder and piston assemblies 94, 96, and 98 interconnected by fluid conduits with a pressurized source of fluid to maintain pressure within the cylinders, forcing the pistons toward respective bearing pads 97 which bear against the guide rail 68.

As may be seen in FIGS. 3 and 5, a set of cylinder and piston assemblies 94 is located on the upper front portion of each end of the stabilizer head 66. A set of similar cylinder and piston assemblies 96 is located on the lower rear portion of each end of the stabilizer head 66, and four piston and cylinder assemblies 98 are spaced vertically along the inwardly facing side of one of the opposite ends of the stabilizer head 66. Because of the location of the cylinder-and-piston assemblies 94 and 96 the prevailing forces on the stabilizer head 66 are transmitted through the solid portions of the head 66, to the guide rails 68, while the cylinder-and-piston assemblies 94, 96 and 98 of the fluid pressure-biased bearings eliminate excess clearance and thus keep the head 66 in the desired location.

The position of the stabilizer head 66 along the guide rails 68 is sensed and signalled to the control system of the block stabilizer 20 by a pair of position sensors 99, similar to the position sensors 53. Each of the position sensors 99 includes a sensor wave guide in a housing 100 connected with the horizontal foundation 58, and a block stabilizer position-indicating magnet carried on a hollow shaft 102 is connected with the stabilizer head 66 by a bracket 104 and is moved thereby with respect to the wave guide tube as the stabilizer head 66 moves along the guide rails 68.

The position sensors 99 each frequently (normally once every five milliseconds) provide an electrical output pulse whose duration is representative of the position of the position indicating magnets relative to the wave guide tubes 100. The duration of each pulse is measured by counting pulses from an oscillator, resulting in a position signal from each of the position sensors 99 which may be used as feedback in keeping the stabilizer head 66 in the desired location with respect to the veneer knife 38.

Since one of the objectives of the use of the block stabilizer is to minimize the amount of movement of a block 34 which occurs as reaction to changes in the amount of force required to cut a layer of veneer from the block 34, the stabilizer head 66 itself is several times as massive as most blocks being peeled into veneer. That is, the stabilizer head 66 weighs about 5600 pounds in an exemplary block stabilizer for a lathe designed to accept blocks about 102 inches in length. A block of Douglas fir of this length and 30 inches in diameter weighs, in contrast, only 1800 pounds, while the average block is only about 15 inches in diameter and weighs about 500 pounds.

In order to reduce the effort required of the stabilizer head feed drive motors 84 in raising the stabilizer head 66, a pair of cylinder and piston assemblies 106 interconnect the stabilizer head 66 with the main crossmember 62. The cylinder and piston assemblies 106 are provided with fluid under a substantially constant pressure, as by an accumulator 108 (FIG. 8). The fluid pressure provided by the accumulator 108 is preferably somewhat more than sufficient to support the component "Ws" of the weight "W" of the stabilizer head 66. Thus a moderate (perhaps 1500 pounds) upward components "Fs" of the weight "W" of the stabilizer head 66 remains ordinarily to keep the ball screws 90 under a small amount of axial load in compression during operation of the block stabilizer 20, to minimize the power required of the motors 84. The component "Fs" is, however, less than sufficient to overcome the friction of the stabilizer head 66 against its guide rails and the friction of the stabilizer head feed. Additionally, the ball screw nuts 92 are preloaded to eliminate lost motion and thereby closely control the location of the stabilizer head 66 along the guide rails 68. A perpendicular component "Wp" is supported by the guide rails 68.

As shown in FIGS. 9 and 10, at least one of the roller supports, for example the roller support 78, includes a disc encoder 110 driven by the associated rear roller 80, through a belt 112, to produce a signal comprising electrical pulses each indicative of a certain amount of rotation of the respective rear roller 80.

OPERATION

In operation of the block stabilizer 20, the stabilizer head 66 is moved along the guide rails 68, in coordination with movement of the veneer knife carriage 39 along the ways 40 toward the chuck axis of rotation 32 during peeling of a ribbon of veneer 44 from a block such as the block 34. Preferably, the stabilizer head 66 is moved to keep the rear rollers 80 and front rollers 82 continuously located where they should theoretically contact the surface of the block 34 when the longitudinal central axis 35 of the block 34 is located coincident with the chuck axis of rotation 32. In actuality, however, the spindles 27 are capable of some flexure, and some movement of the block 34 is possible with respect to the chucks 28 and 30, so that it is possible for the central axis 35 to be displaced from the spindle axis of rotation by as much as 0.100 inch. Such displacement is most likely when the outer chucks 30 are withdrawn and the smaller inner chucks 28 can be deflected by the pressures of the pressure bar 42, knife 38, and the block stabilizer 20.

Figure 12:
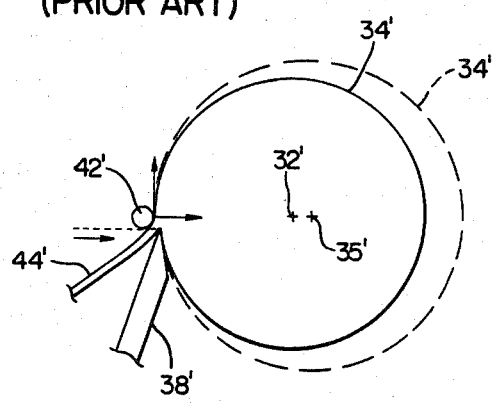
FIG. 12 is a diagrammatic end view showing some of the forces acting on a block being peeled in a veneer lathe without a block stabilizer.
Figure 13:
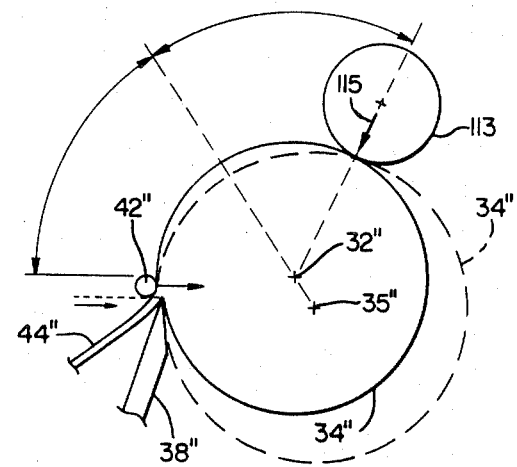
FIG. 13 is a diagrammatic end view showing displacement of a block from its intended location in a veneer lathe equipped with a block stabilizer.
Figure 14:
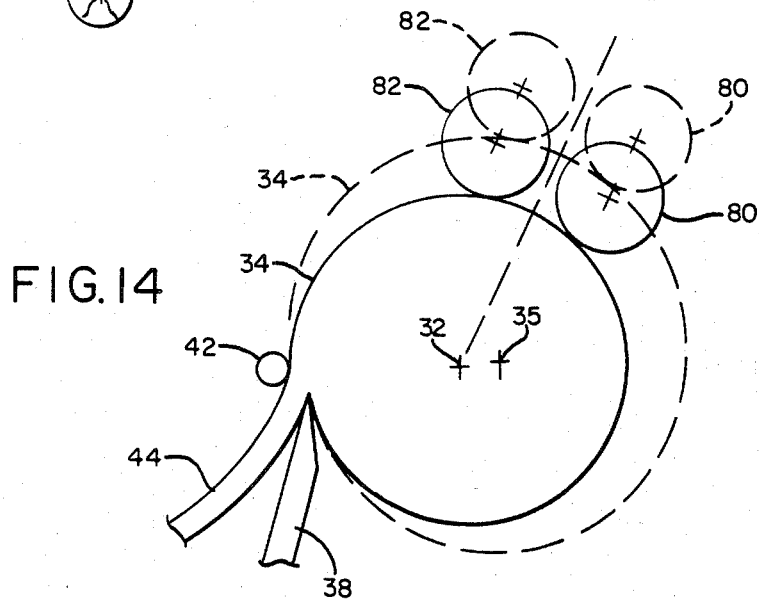
FIG. 14 is a diagrammatic end view showing the location of a block in a lathe equipped with a block stabilizer operated according to the method of the present invention.

Referring now also to FIGS. 12–14, in peeling a layer of veneer 44' from a block on a prior art veneer lathe having no block stabilizer 20, pressure of the pressure bar 42' in the direction of radially inward travel of the knife 38' during peeling of veneer may result in displacement of the central axis 35' of the block 34' in the direction of movement of the knife 38', to the position shown in broken line. Thus, the block 34' may have an actual radius greater than the distance between the knife 38' and the spindle axis 32', but the block 34' is not thereby displaced downward with respect to the lathe spindle axis of rotation 32'. The sharpened edge of the veneer knife 38' is thus the point of tangency with the approximately cylindrical surface of the block 34'.

However, when a core bracer or block stabilizer roller 113 (FIG. 13) in contact with a block 34" moves along a radial path as indicated by the arrow 115, and a layer of veneer 44" is thinner than the distance by which the knife 38" moves with each rotation of the block 34", as the actual radius of the block 34" becomes larger than the distance from the veneer knife 38" and the spindle axis of rotation 32," the resultant of the forces of the core bracer roller 113 and the pressure bar 42" causes a displacement of the central axis 35" of the block 34" in a downward and rearward direction which changes the effective angle of incidence of the knife 38" with the block 34". This change of the angle of incidence of the knife 38" often results in a thinner layer of veneer 44" continuing to be peeled from the block 34". As a cumulative effect of removing from the block 34" a layer of veneer 44" thinner than the distance moved by the knife 38" by as little as two or three thousandths of an inch with each rotation, the actual radius of the block 34" becomes significantly greater than the distance from the spindle axis 32" to the edge of the veneer knife 38. If not corrected, this condition worsens and results ultimately in the block 34" being forced from the chucks of the veneer lathe. Furthermore, the thinner veneer produced may be unacceptable for its intended use.

In order to prevent the block 34 from being forced out of the veneer lathe 22, then, in accordance with the present invention the rate of movement of the block stabilizer head 66 is adjusted as necessary in response to the actual size of the block 34 at any particular time. This is done to maintain the central axis 35 of the block 34 at a substantially constant height relative to the ways 40 throughout the process of peeling veneer, so that the angular relationships between the block 34, the pressure bar 42, and the edge of the veneer knife 38 remain constant. Thus, instead of the rollers 80 and 82 being in the position of the roller 113 shown in FIG. 13, the rear rollers 80 and front rollers 82 of the block stabilizer 20 are placed as shown in broken line in FIG. 14. The block stabilizer head 66 is thus located radially farther from the spindle axis 32 than where it would be to contact the surface of the block 34 if the block's true radius were the same as the distance between the nose bar 42 and the theoretical spindle axis of rotation 32, as shown in solid line in FIG. 14. This placement of the stabilizer head 66 permits the block 34 to rise by reacting against the upward force of the knife 38 and the chucks 28 and 30 until it contacts the rear rollers 80, with the central axis 35 at the same height as the spindle axis 32.

SYSTEM CONTROL

Figure 15:
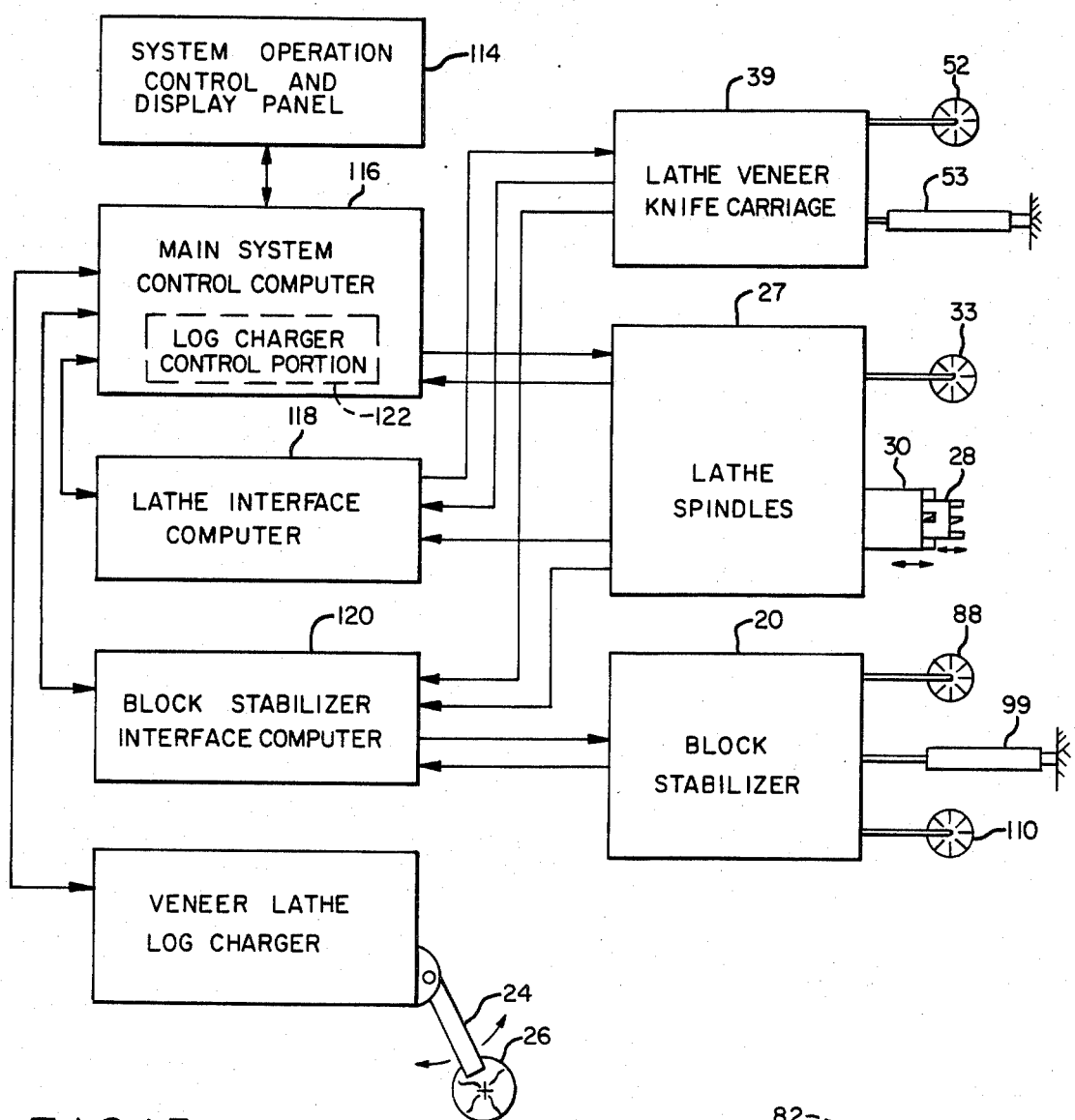
FIG. 15 is a schematic diagram showing the control system for the block stabilizer of the present invention associated with a veneer lathe and equipped with a log charger.

The block stabilizer 20 of the present invention is preferably controlled in conjunction with the veneer lathe 22 and the lathe charger by a set of interrelated electronic digital computers, as shown diagrammatically in FIG. 15. A system operation control and display panel 114 located in the lathe operator control cab 54 displays information showing the status of the lathe 22, block stabilizer 20, and lathe charger, and permits the lathe operator to enter commands to control any of them. For example, the operator can start, stop, or control the speed of the lathe 22, can control the thickness of veneer produced, can drop a block 34 from the chucks 28, and can interrupt operation of the log charger or the block stabilizer 20.

The system operation control and display panel 114 is connected in communication with a main system control computer 116, a digital computer programmed to provide position orders and sequencing commands in electrically coded digital form to each of two smaller computers' lathe interface computer 118, and a block stabilizer interface computer 120, which are both connected directly with the main system control computer 116. The main system control computer 116 provides general control for the lathe 22, the block stabilizer 20, and the log charger, exchanging data with the two smaller computers, which more directly observe and control operation of specific parts of the apparatus in accordance with orders provided by way of the main system control computer 116. A log charger control portion 122 is included in the main system control computer 116, and other smaller computers (not shown) perform servo control functions in the log charger under the control of the main system control computer 116. Each of the interface computers 118 and 120 is a digital computer appropriately programmed to provide servo control of the related equipment, based on frequent receipt and rapid processing of input signals from the sensors associated with the lathe 22, the block stabilizer 20, and the log charger, and to provide feedback information to the main system control computer 116.

The lathe interface computer 118 periodically receives encoded information regarding the veneer knife carriage 39, provided by the position sensors 53, and signals indicating the amount of rotation of the lathe spindles 27, provided by the disc encoder 33. As output signals in response to commands are entered into the operator control and display panel 114, and transmitted to the lathe interface computer 118 via the main system control computer 116, the lathe interface computer 118 provides driving commands to the motor controllers of the knife carriage feed drive motors 46, to move the veneer knife carriage 39 toward the spindle axis of rotation 32 at the required rate to produce veneer of the desired thickness, and transmits signals to lathe spindle drive motor controllers to control the speed of the spindle drive motors 31. The lathe interface computer 118 also reports the amount of rotation of the lathe chucks 28 and 30 and the position of the veneer knife carriage 37 to the main system control computer 116.

The block stabilizer interface computer 120 receives electronic signals from the disc encoder 52 indicating the movement of the veneer knife carriage 39 relative to the spindle axis of rotation 32. It also sends signals to the controllers of the stabilizer head feed drive motors 84 and receives feedback signals produced by the block stabilizer position sensors 99. In response to those feedback signals it makes necessary corrections to control the speed of the block stabilizer head feed drive motors 84.

The block stabilizer interface computer 120 also receives a signal from the disc encoder 110 indicating the amount of rotation of the rear rollers 80. The geometry of the roller supports 72, 74, 76, and 78, the rear rollers 80, and the front rollers 82 is programmed into the block stabilizer interface computer 120. Using the signals from the disc encoder 53 indicating the movement of the knife carriage 39, the block stabilizer interface computer computes a predicted size of the block 34 and predicts the speed and the location of the surface of the block 34 at which the rollers 80 and 82 should contact the block 34. Those predictions are based on assumption that the block 34 is located concentric with the spindle axis of rotation 32, and allow for the spiral shape of the block 34, produced by inward advance of the veneer knife 38 a distance equal to the veneer thickness with each rotation of the block 34.

The block stabilizer interface computer 120 also computes the actual size of the block 34 at frequent intervals, for example, 200 times per second, and uses the actual size as the basis of determining the proper location of the stabilizer head 66. The block stabilizer interface computer 120 first computes the actual surface speed of the block 34 from the signals received from the disc encoder 110 driven by the rear roller 80. From the surface speed computed and from the spindle rotation signals received from the disc encoder 33, it computes an observed block radius about the block central axis 35. If the observed radius of the block 34 is greater than the radius predicted on the basis of the position of the veneer knife 38, a correction of the position of the stabilizer head 66 is made as follows. Using signals from the disc encoder 33 indicating the amount of rotation of the lathe spindles 27, together with the signals from the disc encoder 110, the stabilizer interface computer 120 computes a position at which the block stabilizer head 66 should be located in order to place the rear rollers 80 in contact with the surface of the block 34 and still allow the actual central axis 35 of the block 34 to rise to the same height as the chuck spindle axis of rotation 32. The objective of holding the central axis 35 at a constant height is to preserve the spatial relationships between the spindle axis of rotation 32, the edge of the veneer knife 38, and the pressure bar 42, despite any temporary production of veneer of a smaller thickness than that desired and expected from the rate of movement of the knife carriage 39 toward the spindle axis of rotation 32.

The ball screws 90 are normally being rotated at a substantially regular rate, to move the stabilizer head 66 in response to the motion the knife carriage 39 toward the chuck axis of rotation 32. Correction of the location of the rear rollers 80 and front rollers 82 with respect to the surface of the block 34 therefore requires only a temporary reduction of the rate of rotation of the ball screws 90. Stopping or reversing the ball screws 90 is impractical because either would be likely to break physical contact between the surface of the block 34 and the rear rollers 80. Such a loss of contact might result in a false indication that the size of the veneer block 34 is larger than the actual size, as the disc encoder 110 continues to rotate while the rear rollers 80 coast at the speed of the surface of the block 34 prior to loss of contact with the rear roller 80. If, however, the rate of rotation of the ball screws 90 is reduced more gradually, the veneer block 34 will rise as the space becomes available between the rollers 80 and 82 and the chuck or spindle axis of rotation 32.

The main system control computer 116 controls the operation of the lathe log charger, which scans each log 26 before it is placed in the chucks of the lathe 22. In response to such scanning, the main system control computer 116 develops a mathematical definition of the size and shape of the log 26 and directs the log charger to position the log 26 as a block 34 in the optimum position for production of the maximum amount of veneer. The main system control computer 116 also utilizes the log size information to compute required positions of the lathe veneer knife carriage 39 and the block stabilizer head 66 to provide sufficient clearance for positioning the log 26 in the chucks 28 and 30 upon completion of peeling the preceding block 34.

Preferably, then, the main system control computer 116 controls the entire system in an automatic sequence in which the veneer knife carriage 39 is retracted away from the chuck axis of rotation 32, and the block stabilizer head 66 is retracted to a waiting position far enough from the chuck axis of rotation 32 to provide a predetermined amount of clearance, dependent on the block size, from the outermost surface of the log 26 as it is placed in the chucks 28 and 30. This is necessary because the rear rollers 80 are the first potential point of contact with any portion of the log 26 which either has not been detected, or which may lie outside the shape of the block computed by the size measuring apparatus of the lathe charger system. Until the log 26 has been rotated throughout an angle of somewhat more than two-thirds of a complete rotation, and preferably a complete rotation, the stabilizer head 66 must be maintained radially further from the spindle axis of rotation 32 than the veneer knife 38, to give the veneer knife 38 an opportunity to cut away any branch stubs, knots or other high areas of the block 34, so that the block will not be pushed out of alignment with the chucks 28 and 30 by striking the rear rollers 80.

Thereafter, once the newly-chucked block 34 has rotated far enough to assure that the veneer knife 38 has cut off any projections from the surface, a signal is sent by the main system control computer 116, instructing the interface computer 120 to move the stabilizer head 66 to stabilize the block 34. The block stabilizer interface computer 120, knowing the position of the veneer knife 38, the size of each of the rear rollers 80 and front rollers 82, and the position of each of the rear rollers 80 and front rollers 82 on the block stabilizer head 66, determines the actual position to which the block stabilizer head 66 should be moved and provides the necessary position orders to the stabilizer head feed drive motors 84. The position sensors 99 provide a signal back to the block stabilizer interface computer 120 as feedback for control of the stabilizer head feed drive motors 84. Thus the block stabilizer head 66 is normally brought into position responsive to the position of the veneer knife 38 to contact and stabilize the block 34 as soon as possible after the veneer knife 38 has cut away any large projections from the block 34, and is used throughout the entire process of peeling veneer from the block 34. When the radius of the block 34 is observed to be greater than predicted by the position by the veneer knife 38 relative to the spindle axis of rotation 32, the tracking position of the block stabilizer head 66 relative to the veneer knife 38 is adjusted as previously described. This method of controlling the block stabilizer 20 gives the block 34 increased stability throughout the process of peeling, significantly increasing the amount of useable veneer produced from blocks having serious radial checks or pitch rings, before such defects ultimately prevent further peeling from a particular block.

As the block stabilizer head 66 moves inward toward the lathe spindle axis of rotation 32 the angle 126 (FIG. 11) about the lathe spindle axis, between the lines of contact of the front rollers 82 and the rear rollers 80 with the block 34, increases. As a result, the stabilizer head 66 actually moves radially inward faster than the knife 38, as the rollers 80 and 82 shift angularly with respect to the block 34 to give an increasing amount of support to the block 34 as its size decreases. Thus, as the block 34 becomes more slender, it is supported by the inner chucks 28 (after retraction of the outer chucks 30), together with the edge of the knife 38, the pressure bar 42, and at least the rear rollers 80. If the block 34 is in its intended location concentric with the spindles 27, it will be nested between the front rollers 82 and the rear rollers 80, with increasing angular separation between the pressure bar 42 and the rear rollers 80, and between the front rollers 82 and the rear rollers 80.

Through the operator control and display panel 114 the lathe operator also has the optional ability to order the stabilizer head 66 to be retracted clear of the block 34, as may be necessary if a block 34 finally splits apart. The operator may also direct that the block stabilizer be retracted a particular distance away from the block 34, or return to a position following inward progress of the veneer knife 38, during peeling of the block 34.

The block stabilizer's position may be calibrated by placing a cylindrical calibration block (not shown) precisely in the chucks 28 and 30 of the spindles 27 and measuring and adjusting the physical relationships between the calibration block, the veneer knife 38, the pressure bar 42, log charger, and the block stabilizer head 66 and rollers 80 and 82, adjusting clearances to account for the actual spiral shape of a block 34 being peeled. Once the apparatus has been placed in known and desired physical relationships, the signals to the computers 116, 118, and 120 from the various sensors are entered as references from which adjustments can be made if necessary, during operation. Additionally, the physical locations are checked using bench marks on the apparatus as secondary references. Having such references makes it possible to verify the accuracy of the position sensors 53 and 99. At regular intervals, as when installing freshly sharpened knives 38 into the lathe 22, the locations of the veneer knife 38 and stabilizer head 66 and knife carriage can be measured with respect to the bench marks and the sensor signals can be compared with the expected signals. Minor variations can then be adjusted by entering corrections by way of the control and display panel 114 into the computers 116, 118, and 120.

Wide angle spray nozzles 128 are mounted on the main beam 70 and connected with a pressurized selectively controllable supply by conduits (not shown) to spray a suitable solvent, such as diesel oil, onto the rollers 80 and 82 to prevent pitch buildup from changing their effective sizes and thus altering their effects on a block 34 being peeled.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A veneer lathe for cutting veneer from a veneer block, comprising:
   (a) spindle means including a pair of chucks for engaging a block of wood;
   (b) veneer knife means for cutting a thin layer of veneer from said block;
   (c) spindle motor means for rotating said spindle means about a spindle axis of rotation;
   (d) knife carriage feed drive means for advancing said veneer knife means radially inward toward said spindle axis of rotation;
   (e) means for sensing the amount of rotation of said spindle means;
   (f) means for sensing the amount of advancement of said veneer knife means toward said axis of rotation of said spindle means;
   (g) a block stabilizer including stabilizer head means movable radially with respect to said spindle axis of rotation, for limiting radial movement of said block with respect to said spindle axis of rotation during peeling of veneer therefrom;
   (h) stabilizer head feed drive means for moving said stabilizer head means radially inward with respect to said spindle axis of rotation, in response to sensing advancement of said veneer knife means, throughout substantially the entire time during which veneer is being peeled from said block;
   (i) block size sensing means for periodically determining an actual size of said block; and
   (j) control means for periodically calculating a predicted size of said block in response to sensing advancement of said veneer knife means and the amount of rotation of said spindle means during cutting of veneer from a block, and for temporarily retarding radially inward movement of said block stabilizer head means, in response to sensing that said actual size of said block is in excess of said predicted size of said block.

2. The veneer lathe of claim 1 wherein said means for sensing the amount of rotation of said spindle means includes disc encoder means driven by said spindle motor means for producing an electrical signal indicative of said amount of rotation.

3. The veneer lathe of claim 2 wherein said means for sensing the amount of advance of said veneer knife means includes disc encoder means driven by said knife carriage feed drive means for producing an electrical signal indicative of movement of said veneer knife means.

4. The veneer lathe of claim 1 wherein said block stabilizer head means includes at least one roller supported rotatably thereon, each said roller including a block-contacting surface extending parallel with said spindle axis of rotation, said block size sensing means including a disc encoder driven by at least one of said at least one roller means for producing an electrical signal indicative of the amount of rotation of said roller.

5. The veneer lathe of claim 4, including veneer knife position sensing means and stabilizer head means position sensing means for producing electrical signals indicative of the positions of said veneer knife and said stabilizer head means with respect to said spindle axis of rotation.

6. The veneer lathe of claim 4, including spray head means for selectively cleaning each said roller.

7. A method of operating a veneer lathe, comprising:
   (a) engaging an elongate block of wood between a pair of chucks and rotating said block about a spindle axis of rotation;
   (b) controllably moving a veneer knife radially inwardly toward said spindle axis of rotation so as to peel a layer of veneer of a predetermined thickness from said block while rotating of said block;
   (c) sensing the radially inward movement of said veneer knife and periodically automatically calculating a predicted block size in response thereto; and
   (d) hiolding said block in a substantially constant location with respect to said spindle axis of rotation by moving a block stabilizer head radially inwardly toward said spindle axis of rotation in response to sensing said radially inward movement of said veneer knife toward said spindle axis of rotation, so as to maintain a block contacting surface thereof substantially in contact with said block during substantially the entire time during which veneer is being peeled from said block.

8. The method of claim 7, including moving said block stabilizer along a radial plane separated from said veneer knife by an angle of 100°–140° about said spindle axis.

9. The method of claim 7 including maintaining a block-contacting surface of said block stabilizer in said predicted block surface location along at least 60% of the length of said veneer block.

10. A method of operating a block stabilizer in conjunction with operation of a veneer lathe peeling veneer from a block, comprising:
   (a) sensing the amount of radially inward movement of a veneer knife from a predetermined position toward a spindle axis of rotation associated with a set of chucks holding a block being peeled in said veneer lathe;
   (b) calculating a predicted size of said veneer block in response to sensing said radially inward movement of said veneer knife;
   (c) sensing the actual size of said veneer block during peeling of veneer;
   (d) moving a block stabilizer generally radially inwardly toward said spindle axis of rotation in response to said movement of said veneer knife so as to maintain a block-engaging surface thereof in a first relative location having a predetermined relationship to the instantaneous location of said veneer knife;
   (e) repeating steps (a) through (d) at frequent intervals during peeling of veneer from said block; and
   (f) temporarily adjusting the movement of said block stabilizer so as to adjust the location of said block-engaging surface thereof to a second relative location having a greater radial distance from said spindle axis of rotation of said set of chucks than said first relative location, in response to sensing that said actual size of said veneer block is greater than said predicted size.

11. The method of claim 10, including performing step (e) at least several times per second.

12. The method of claim 10 including in step (b) sensing the amount of rotation of said set of chucks during peeling of veneer and calculating a predicted surface speed of a peripheral surface of said veneer block in response to sensing the rotation of said set of chucks and movement of said veneer knife, and including in step (c) sensing the actual speed of said peripheral surface.

13. The method of claim 12, including placing a roller carried rotatably on said block stabilizer in contact with said peripheral surface and measuring the amount of rotation of said roller while peeling veneer from said block.

14. A method of operating a veneer lathe, comprising:
  (a) automatically determining a maximum radius of a veneer block to be peeled into veneer;
  (b) automatically positioning a veneer knife of said lathe farther than said maximum radius from a spindle axis of rotation of said lathe;
  (c) automatically positioning a block stabilizer farther than said veneer knife from said spindle axis of rotation;
  (d) automatically placing said veneer block in position for peeling in said lathe;
  (e) thereafter gripping said veneer block and rotating it about said spindle axis of rotation by means of a pair of chucks;
  (f) moving said veneer knife radially inward toward said spindle axis of rotation during rotation of said veneer block so as to cut a thin sheet of veneer from said veneer block;
  (g) sensing the amount of rotation of said chucks;
  (h) sensing the movement of said veneer knife;
  (i) periodically automatically calculating a predicted location of a peripheral surface of said veneer block during peeling of veneer therefrom, in response to sensing the amount of rotation of said chucks and the movement of said veneer knife;
  (j) automatically moving said block stabilizer radially inward toward said spindle axis of rotation to place a block-contacting surface thereof at said predicted location in order to gain and maintain contact with said peripheral surface in response to sensing rotation of said chucks and movement of said veneer knife; and
  (k) periodically repeating steps (g) through (j) throughout substantially the entire time of performance of step (f).

15. The method of claim 14, including the further steps of periodically determining a predicted size of said veneer block in response to sensing said rotation of said chucks and said movement of said veneer knife, sensing an actual size of said veneer block, and temporarily moving said block stabilizer radially inwardly at a reduced rate with respect to said movement of said veneer knife to permit said veneer block to rotate about a central axis located in a plane containing said spindle axis of rotation and extending parallel with the movement of said veneer knife, in response to sensing that said actual size is greater than said predicted size.

* * * * *